EDMUND S. HANNA.
Improvement in Paper Washer.
No. 5,422. Reissued May 20, 1873.
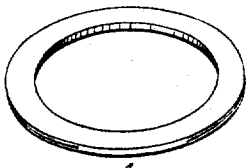
A
Attest;
R. C. Wrenshall
James I. Kay
Inventor;
Edmund S. Hanna
by his attorneys
Bakewell Christy & Kerr
AM. PHOTO-LITHOGRAPHIC CO. N.Y. (OSBORNE'S PROCESS.)

UNITED STATES PATENT OFFICE.

EDMUND S. HANNA, OF PITTSBURG, PENNSYLVANIA.

IMPROVEMENT IN PAPER WASHERS.

Specification forming part of Letters Patent No. 119,604, dated October 3, 1871; reissue No. 5,422, dated May 20, 1873; application filed December 14, 1872.

*To all whom it may concern:*

Be it known that I, EDMUND S. HANNA, of Pittsburg, in the county of Allegheny and State of Pennsylvania, have invented a new and useful Improvement in Paper Washers, and I do hereby declare the following to be a full, clear, and exact description thereof.

My invention consists in making washers of paper which has been treated in the manner described in Letters Patent No. 113,454. In the said Letters Patent, the paper is treated to a bath of the concentrated mother-water or liquor resulting from the manufacture of chloride of zinc, or of the chlorides of tin, calcium, magnesium, or aluminium. The effect of the immersion upon the paper is to impart to it qualities which I have discovered especially adapt it for this use.

To enable others skilled in the art to make use of my invention, I will describe the same more fully.

I cut the washer A, shown in the drawing, out of paper treated as above described, of the desired thickness by means of a stamp or cutter of circular shape. This washer is very hard and light, and does not wear away quickly; is much more durable than leather, and much cheaper than iron. It may be made of any desired size, thickness, or shape.

What I claim as my invention, and desire to secure by Letters Patent, is—

A washer made of paper which has been previously treated with the concentrated mother-water of the chloride of zinc, &c., substantially as hereinbefore described.

In testimony whereof I, the said EDMUND S. HANNA, have hereunto set my hand.

EDMUND S. HANNA.

Witnesses:
W. N. PAXTON,
THOS. B. KERR.